(12) United States Patent
Kim

(10) Patent No.: US 11,837,735 B2
(45) Date of Patent: Dec. 5, 2023

(54) CATALYST, METHOD FOR PRODUCING SAME, ELECTRODE COMPRISING SAME, MEMBRANE-ELECTRODE ASSEMBLY COMPRISING SAME, AND FUEL CELL COMPRISING SAME

(71) Applicant: KOLON INDUSTRIES, INC., Seoul (KR)

(72) Inventor: Jung Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 231 days.

(21) Appl. No.: 17/286,892

(22) PCT Filed: Dec. 16, 2019

(86) PCT No.: PCT/KR2019/017768
§ 371 (c)(1),
(2) Date: Apr. 20, 2021

(87) PCT Pub. No.: WO2020/138799
PCT Pub. Date: Jul. 2, 2020

(65) Prior Publication Data
US 2021/0384525 A1 Dec. 9, 2021

(30) Foreign Application Priority Data
Dec. 26, 2018 (KR) .................. 10-20180-0169073

(51) Int. Cl.
*H01M 4/92* (2006.01)
*H01M 4/86* (2006.01)
(Continued)

(52) U.S. Cl.
CPC ............ *H01M 4/926* (2013.01); *B01J 23/40* (2013.01); *B01J 23/42* (2013.01); *H01M 4/8652* (2013.01);
(Continued)

(58) Field of Classification Search
None
See application file for complete search history.

(56) References Cited

U.S. PATENT DOCUMENTS

2006/0159980 A1 7/2006 Pak et al.
2008/0008920 A1 1/2008 Alexandrovichserov
(Continued)

FOREIGN PATENT DOCUMENTS

CN 101379639 A 3/2009
CN 103157465 A 6/2013
(Continued)

OTHER PUBLICATIONS

Machine translation of CN 103157519, Jun. 2013.*
(Continued)

*Primary Examiner* — Jonathan Crepeau
(74) *Attorney, Agent, or Firm* — Harvest IP Law, LLP

(57) ABSTRACT

Disclosed are a catalyst, a method for producing the catalyst, an electrode comprising the catalyst, a membrane-electrode assembly comprising the electrode, and a fuel cell comprising the membrane-electrode assembly, the catalyst having superb catalytic activity that can be obtained by means of a simple post-treatment process of the raw catalyst. The catalyst according to the present invention comprises a support, and metal particles supported therein, wherein the metal particles comprise main particles and an additional metal layer thereon, and the main particles and additional metal layer comprise the same metal elements. The metal particles have a budding structure or a rod structure by having just a particular latticed active surface of the main particles grow to form the additional metal layer, or a core-shell structure by having the entire latticed active surface of the main particles grow to form the additional metal layer.

3 Claims, 9 Drawing Sheets

(51) Int. Cl.
  *H01M 4/88* (2006.01)
  *H01M 4/90* (2006.01)
  *B01J 23/42* (2006.01)
  *B01J 23/40* (2006.01)
  *H01M 8/1004* (2016.01)

(52) U.S. Cl.
  CPC ....... *H01M 4/8657* (2013.01); *H01M 4/8842* (2013.01); *H01M 4/8882* (2013.01); *H01M 4/9083* (2013.01); *H01M 8/1004* (2013.01)

(56) References Cited

U.S. PATENT DOCUMENTS

| | | | |
|---|---|---|---|
| 2009/0220682 A1* | 9/2009 | Monnier | C23C 18/1651 427/113 |
| 2011/0251055 A1 | 10/2011 | Fu | |

FOREIGN PATENT DOCUMENTS

| | | |
|---|---|---|
| CN | 103157519 A | 6/2013 |
| CN | 105638729 A | 6/2016 |
| CN | 106794448 A | 5/2017 |
| CN | 107146895 A | 9/2017 |
| CN | 107921419 A | 4/2018 |
| IN | 108232203 A | 6/2018 |
| JP | 2005135900 A | 5/2005 |
| JP | 2006228450 A | 8/2006 |
| JP | 2010077473 A | 4/2010 |
| JP | 2018502982 A | 2/2018 |
| KR | 100601984 B1 | 7/2006 |
| KR | 20070031133 A | 3/2007 |
| KR | 101689921 B1 | 12/2016 |
| KR | 20170079621 A | 7/2017 |
| KR | 101802098 B1 | 11/2017 |
| KR | 20180076907 A | 7/2018 |
| WO | 2006087928 A1 | 8/2006 |

OTHER PUBLICATIONS

Chaudhari Nitin K et al: "Nanodendrities of platinum-group metals for electrocatalytic applications".
EP search report dated Sep. 5, 2022.
KR office action dated Dec. 14, 2021.
Core-Shell-Structured Low-Platinum Electrocatalysts for Fuel Cell Applications, "Electrochemical Energy Reviews (2018) 1:324-387", Rongfang Wang.
Star-shaped Pd@Pt core-shell catalysts supported on reduced graphene oxide with superior electrocatalytic performance, "Journal of Materials Chemistry A", Youngmin Kim , Jul. 2018.
JP office action dated May 30, 2022.
Pd-Pt Bimetallic Nanodendrites with High Activity for Oxygen Reduction, Byungkwon Lim et al.
JP office action dated Nov. 30, 2022.
International Search Report dated Apr. 8, 2020.

* cited by examiner

CATALYST, METHOD FOR PRODUCING SAME, ELECTRODE COMPRISING SAME, MEMBRANE-ELECTRODE ASSEMBLY COMPRISING SAME, AND FUEL CELL COMPRISING SAME

CROSS REFERENCE TO RELATED APPLICATIONS

This application is a National Stage of International Application No. PCT/KR2019/017768 filed Dec. 16, 2019, claiming priority based on Korean Patent Application No. 10-2018-0169073 filed Dec. 26, 2018.

TECHNICAL FIELD

The present invention relates to a catalyst, a method for manufacturing the same, an electrode comprising the same, a membrane-electrode assembly comprising the same, and a fuel cell comprising the same. More particularly, the present invention relates to a catalyst having excellent catalytic activity that can be obtained by performing a simple post-treatment process on a raw catalyst, a method for manufacturing the same, an electrode comprising the same, a membrane-electrode assembly comprising the same, and a fuel cell comprising the same.

BACKGROUND ART

A fuel cell is an electric-power-generating system for directly converting the energy from a chemical reaction between oxygen and hydrogen contained in a hydrocarbon-based material such as methanol, ethanol, or natural gas into electric energy. A typical example of such a fuel cell is a polymer electrolyte membrane fuel cell (PEMFC). The PEMFC is in the spotlight as a next-generation energy source, and research into the commercialization thereof is actively being conducted owing to advantages such as environmental friendliness in the automotive field.

In the fuel cell system, a membrane-electrode assembly (MEA), which is the portion thereof that substantially generates electricity, has a structure in which a polymer electrolyte membrane containing a proton-conducting polymer is interposed between an anode (also called a "fuel electrode" or an "oxidization electrode") and a cathode (also called an "air electrode" or a "reduction electrode"). Each electrode is formed using a mixture of a catalyst, an ionomer, a solvent and an additive, and the catalyst is a major factor that determines the activity and durability of the fuel cell.

As catalysts used in the oxidization electrode and the reduction electrode, Pt/C catalysts, including platinum nanoparticles supported on a carbon support and having a large specific surface area and excellent electrical conductivity, are most widely used. However, Pt/C catalysts are expensive because they are made using pure platinum, which is an expensive metal. Therefore, studies have been conducted on supports to improve the catalytic activity while reducing the amount of platinum that is used. For example, carbon-based materials such as graphite, carbon nanofibers, carbon nanotubes, carbon black and the like, having advantages such as low cost and high specific surface area and physical and chemical stability, have been studied.

Methods of supporting nano-sized platinum or platinum-transition metal alloy particles on a carbon support include a method of reducing platinum ions to platinum using sodium borohydride ($NaBH_4$), which is a strong reducing agent, under basic conditions, and a method including mixing NaOH, a platinum precursor and carbon, with a solvent that serves as both a solvent and a reducing agent in a predetermined ratio, reducing platinum from the platinum precursor using ethylene glycol, and then inducing an interaction between the support and the reduced platinum through control of pH to support platinum on the support.

However, these methods have problems in that the particle size distribution is not properly controlled due to aggregation of platinum particles and in that a catalyst becomes useless if incorrectly prepared.

DISCLOSURE

Technical Problem

An aspect of the present invention is to provide a catalyst having good catalytic activity that can be obtained by performing a simple post-treatment process on a raw catalyst.

Another aspect of the present invention is to provide a method of manufacturing a catalyst that is, by conducting a simple post-treatment process on a raw catalyst, capable of (i) further improving the catalytic activity of the catalyst or (ii) improving the activity of the catalyst that has been incorrectly prepared and thus become unusable to a usable level, thereby preventing expensive precious-metal catalysts from being discarded.

Yet another aspect of the present invention is to provide an electrode including the catalyst.

Still yet another aspect of the present invention is to provide a membrane-electrode assembly including the electrode.

A further aspect of the present invention is to provide a fuel cell including the membrane-electrode assembly.

Technical Solution

In accordance with the aspect of the present invention, there is provided a catalyst comprising: a support; and a metal particle supported on the support, wherein the metal particle comprises a main particle, and an additional metal layer on the main particle, wherein the main particle and the additional metal layer include the same metal element, and wherein only a specific active lattice plane of the main particle grows to form the additional metal layer and thereby impart a bud structure or a rod structure to the metal particle, or an entire active lattice plane of the main particle grows to form the additional metal layer and thereby impart a core-shell structure to the metal particle.

The additional metal layer may be present in an amount of 20% or more by weight of the metal particle.

In accordance with another aspect of the present invention, there is provided a method of manufacturing a catalyst, the method comprising: preparing a raw catalyst including a support and a main particle supported on the support; preparing a metal precursor, wherein the main particle and the metal precursor comprise the same metal element; preparing a weak reducing agent selected from the group consisting of formaldehyde, formic acid, oxalic acid, ascorbic acid, citric acid, urea, ethylenediamine, hexamethylenetetramine and mixtures of two or more thereof; mixing the raw catalyst, the metal precursor, and the weak reducing agent to obtain a mixture; and hydrothermally treating the mixture to selectively grow only a specific active lattice plane of the main particle or to grow an entire active lattice plane of the main particle.

The support may be selected from the group consisting of carbon black, porous carbon, carbon fiber, carbon nanotube (CNT), carbon nanohorn and graphene.

The main particle may comprise at least one selected from the group consisting of platinum (Pt), palladium (Pd), ruthenium (Ru), iridium (Ir), osmium (Os), and a platinum-Me alloy, wherein Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y) and rhodium (Rh).

The hydrothermal treatment may be carried out at a temperature of 60 to 250° C. for 4 to 20 hours.

In accordance with yet another aspect of the present invention, there is provided an electrode comprising the aforementioned catalyst and an ionomer.

In accordance with still yet another aspect of the present invention, there is provided a membrane-electrode assembly comprising: an anode; a cathode; and an ion exchange membrane interposed between the anode and the cathode, wherein at least one of the anode and the cathode is the aforementioned electrode.

In accordance with a further aspect of the present invention, there is provided a fuel cell including the aforementioned membrane-electrode assembly.

Advantageous Effects

The present invention is economically efficient because, by performing a simple hydrothermal treatment on a mixture of a raw catalyst, a metal precursor and a weak reducing agent, it is capable of further improving the activity of the catalyst, and improving the activity of even an incorrectly prepared catalyst to a usable level in order to prevent an expensive precious-metal catalyst from being discarded.

The metal particles of the catalyst obtained through the post-treatment process can have a structure such as a bud-shaped structure, a rod-shaped structure or a core-shell structure, and thus the catalytic activity and performance thereof can be maximized.

MODE OF INVENTION

Figure 1:
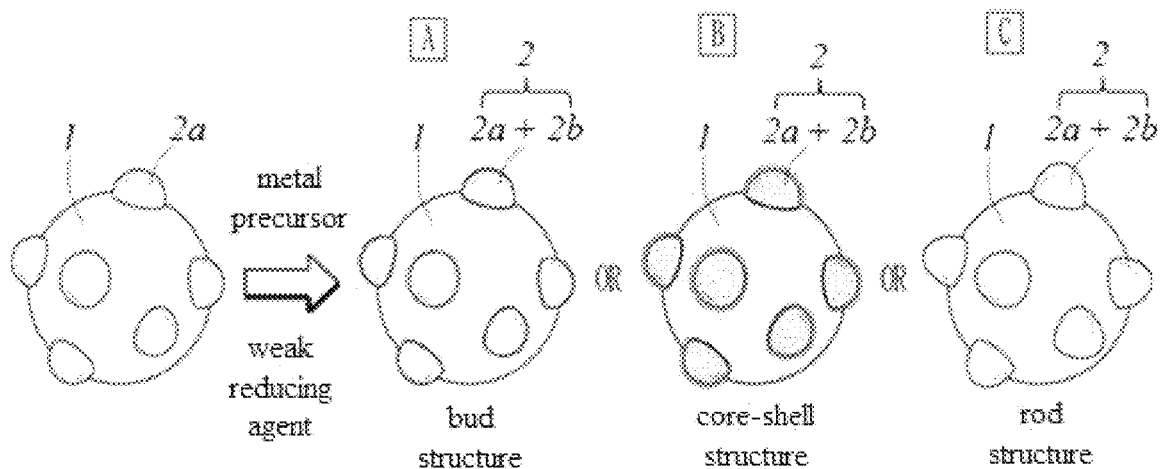
FIG. 1 is a schematic diagram illustrating catalysts having shapes variously improved by post-treating a raw catalyst according to embodiments of the present invention.

Hereinafter, the present invention will be described in more detail with reference to specific examples. However, the following examples are provided only for better understanding of the present invention and should not be construed as limiting the scope of the present invention, and the present invention is defined by the scope of the claims described below.

The catalyst of the present invention includes a support and a metal particle supported on the support.

The metal particle includes a main particle and an additional metal layer on the main particle. The main particle and the additional metal layer include the same metal element.

According to the present invention, (i) only a specific active lattice plane of the main particle grows to form the additional metal layer, so that the metal particle has a bud structure or rod structure, or (ii) the entire active lattice plane of the main particle grows to form the additional metal layer so that the metal particle has a core-shell structure.

When post-treatment is performed on a raw catalyst, for example, a commercially available catalyst, including a main particle supported on a support, the main particle grows using a specific active lattice plane or the entire active lattice plane thereof as a reactive lattice plane, so that a metal particle having a bud structure or a rod structure or a metal particle having a core-shell structure can be obtained, and thus the performance of the catalyst can be maximized.

In order to effectively improve the activity of the catalyst, the additional metal layer may be present in an amount of 20% or more by weight of the metal particle.

A method of manufacturing a catalyst according to the present invention comprises: preparing a raw catalyst; preparing a metal precursor; preparing a weak reducing agent;

mixing the raw catalyst, the metal precursor, and the weak reducing agent to obtain a mixture; and hydrothermally treating the mixture to selectively grow only a specific active lattice plane of the main particle or to grow the entire active lattice plane of the main particle.

The raw catalyst includes a support and a main particle supported on the support.

The main particle and the metal precursor include the same metal element.

The weak reducing agent includes any one selected from the group consisting of formaldehyde, formic acid, oxalic acid, ascorbic acid, citric acid, urea, ethylenediamine, hexamethylenetetramine and mixtures of two or more thereof.

According to the catalyst-manufacturing method of the present invention, a catalyst having excellent activity can be obtained by performing simple hydrothermal treatment on a mixture of a raw catalyst, a metal precursor, and a weak reducing agent. In addition, the method of the present invention is economical because it can increase the catalytic activity of a raw catalyst that has been incorrectly prepared and would thus otherwise be considered unusable, to a usable level, thereby preventing expensive noble metal catalysts from being discarded. The performance of the catalyst can be maximized by utilizing a specific portion of the surface or the entire surface of the main particles of the raw catalyst as a reaction active point and selectively growing the specific active lattice plane of the main particle or growing the entire active lattice plane of the main particle.

FIG. 1 is a schematic diagram illustrating catalysts having various improved shapes obtained by post-treating raw catalysts according to embodiments of the present invention. Referring to FIG. 1, through the post-treatment of the raw catalysts in which a main particle 2a is supported on the support 1, (i) only a specific active lattice plane of the main particle 2a grows to form an additional metal layer 2b, thereby converting the main particle 2a into a metal particle 2 of a bud-shaped or rod-shaped structure (catalyst A and catalyst C), or (ii) the entire active lattice plane of the main particle 2a grows to form an additional metal layer 2b, thereby converting the main particle 2a into a metal particle 2 of a core-shell structure (catalyst B). While all the three structural changes occur in most cases, in order to selectively increase the conversion into a desired structure, the final structures of the metal particles 2 may be controlled by adjusting at least one of the type of metal precursor, the type of weak reducing agent, the amount of weak reducing agent, the time of hydrothermal treatment, the pH of the mixture, and the temperature of hydrothermal treatment.

The support 1 of the present invention may be selected from (i) a carbon-based support, (ii) a porous inorganic oxide such as zirconia, alumina, titania, silica, ceria, etc., and (iii) a zeolite. The carbon-based support may be selected from the group consisting of carbon black, porous carbon, carbon nanotube (CNT), carbon nanohorn, graphene, super P, carbon fiber, carbon sheet, Ketjen black, acetylene black, carbon sphere, carbon ribbon, fullerene, activated carbon and combinations of two or more thereof, but is not limited thereto. Any support that can be used in the art to which the present invention pertains may be used without limitation.

The main particle 2a supported on the support 1 may be positioned on the surface of the support 1 or may penetrate into the support 1 while filling the pores in the support 1.

Any one that can be used as a catalyst metal in hydrogen oxidation reaction and/or oxygen reduction reaction can be used as the main particle 2a. For example, the main particle 2a may include at least one platinum-based metal selected from the group consisting of platinum (Pt), palladium (Pd), ruthenium (Ru), iridium (Ir), osmium (Os), and platinum-Me alloys, but is not limited thereto.

Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y) and rhodium (Rh). That is, the platinum-Me alloy would be a binary alloy when Me represents one metal element, the platinum-Me alloy would be a ternary alloy when Me represents two metal elements, and the platinum-Me alloy would be a multi-component alloy when Me represents three or more metallic elements.

The metal particle 2 obtained according to the method of the present invention may be present in the catalyst in an amount of 20 to 80% by weight with respect to the total weight of the catalyst. If the content of the metal particle 2 is less than 20% by weight, the catalytic activity could be deteriorated. On the other hand, if the content of the metal particle 2 exceeds 80% by weight, the active area may be decreased due to agglomeration of the metal particle 2, thereby causing deterioration of the catalytic activity thereof.

In addition, as described above, in order to effectively enhance the catalytic activity, the additional metal layer 2b may be present in an amount of 20% or more by weight of the metal particle 2.

The metal precursor that can be used in the method of the present invention contains the same metal element as the main particle 2a. For example, the metal precursor may be a compound containing the platinum-based metal as described above or a solution containing the compound.

The weak reducing agent that can be used in the method of the present invention is a relatively weak reducing agent causing less reduction compared to a strong reducing agent such as $NaBH_4$, $LiAlH_4$, e-beam, hydrogen gas, diborane or iron (II) sulfide, and is selected from the group consisting of formaldehyde, formic acid, oxalic acid, ascorbic acid, citric acid, urea, ethylenediamine, hexamethylenetetramine, and mixtures of two or more thereof.

The hydrothermal treatment of the present invention can be carried out at a temperature of 60 to 250° C. for 4 to 20 hours.

If the hydrothermal treatment temperature is less than 60° C. or the hydrothermal treatment time is less than 4 hours, the weak reducing agent would not work and the additional metal layer 2b could not be sufficiently formed. On the other hand, if the hydrothermal treatment temperature exceeds 250° C. or the hydrothermal treatment time exceeds 20 hours, an additional metal layer 2b would be excessively formed, disadvantageously causing agglomeration of the metal particle 2 and adversely affecting the catalytic performance.

The weight ratio of the metal precursor to the weak reducing agent may be 1:1 to 1:10, but is not limited thereto. An appropriate weight ratio can be selected to obtain a metal particle 2 having a desired structure.

By appropriately adjusting the temperature, pH and time of the hydrothermal treatment, the types, feed timings and feed amounts of the metal precursor and weak reducing agent, and so on, the metal particle 2 of a specific desired structure can be formed in a relatively greater amount.

For example, (i) when hydrothermal treatment is conducted at a temperature of 110 to 150° C. for 6 to 10 hours while increasing the relative amount of the weak reducing agent, the main particles 2a tend to grow only at the specific active lattice surfaces thereof [i.e., an additional metal layers 2b are formed only on the specific active lattice planes of the main particles 2a] so that a relatively large number of bud-structured metal particles 2 can be obtained, and (ii) when a mixture obtained by mixing a raw catalyst, a metal precursor and a weak reducing agent is made basic by means of NaOH and is then subjected to hydrothermal treatment at a temperature of 130 to 170° C. for 10 to 14 hours, the main particles 2a tend to grow at the entire active lattice planes thereof [i.e., additional metal layers 2b are formed on the entire active lattice planes of the main particles 2a] so that a relatively large number of core-shell structured metal particles 2 can be obtained, and (iii) when hydrothermal treatment is performed under relatively mild conditions, i.e., at a temperature of 80 to 120° C., for a long time of 10 to 14 hours, a relatively large number of rod-shaped metal particles 2 can be obtained.

The electrode of the present invention includes a catalyst manufactured by the method of the present invention described above and an ionomer mixed with the catalyst.

The ionomer may be a cation conductor having a cation exchange group capable of exchanging a cation such as a proton, or an anion conductor having an anion exchange group capable of exchanging an anion such as a hydroxyl ion, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and generally may be a sulfonic acid groups or a carboxyl group.

The cation conductor includes a cation exchange group and may be: a fluorine-based polymer containing fluorine in the main chain; a hydrocarbon-based polymer such as benzimidazole, polyamide, polyamideimide, polyimide, polyacetal, polyethylene, polypropylene, an acrylic resin, polyester, polysulfone, polyether, polyetherimide, polyethersulfone, polyetherimide, polycarbonate, polystyrene, polyphenylene sulfide, polyether ether ketone, polyether ketone, polyaryl ether sulfone, polyphosphazene or polyphenylquinoxaline; a partially fluorinated polymer such as polystyrene-graft-ethyl enetetrafluoroethylene copolymer or polystyrene-graft-polytetrafluoroethylene copolymer; a sulfone imide, or the like.

More specifically, when the cation conductor is a proton conductor, the polymers may include a cation exchange group selected from the group consisting of a sulfonic acid group, a carboxylic acid group, a phosphoric acid group, a phosphonic acid group and derivatives thereof in the side chain thereof. Specific examples thereof include, but are not limited thereto: fluoro-based polymers such as poly(perfluorosulfonic acid), poly(perfluorocarboxylic acid), copolymers of fluorovinyl ether and tetrafluoroethylene including a sulfonic acid group, defluorinated sulfided polyetherketone, and mixtures thereof; and hydrocarbon-based polymers such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof.

In the cation conductor, H in the cation exchange group of the side chain end may be substituted with Na, K, Li, Cs or tetrabutylammonium. When substituting H with Na in the cation exchange group of the side chain end, NaOH may be used during the preparation of the carbon structure composition. When substituting H with tetrabutylammonium hydroxide in the cation exchange group of the side chain end, tetrabutylammonium hydroxide may be used. H can also be substituted with K, Li or Cs using an appropriate compound. Since the substitution method is well known in the art, a detailed description thereof will be omitted here.

The cation conductor can be used in the form of a single substance or a mixture, and can also be optionally used in combination with a nonconductive compound to further improve adhesion with the ion exchange membrane. The amount of the cation conductor is preferably adjusted depending on the intended use thereof.

As the nonconductive compound, one or more selected from the group consisting of polytetrafluoroethylene (PTFE), tetrafluoroethylene-hexafluoropropylene copolymers (FEP), tetrafluoroethylene-perfluoroalkyl vinyl ether copolymers (PFA), and ethylene/tetrafluoroethylene (ETFE), ethylene chlorotrifluoro-ethylene copolymers (ECTFE), polyvinylidene fluoride, polyvinylidene fluoride-hexafluoropropylene copolymer (PVdF-HFP), dodecylbenzenesulfonic acid, and sorbitol may be used.

Generally, a metal hydroxide-doped polymer may be used as the anion conductor. Specifically, the anion conductor may be a metal hydroxide-doped poly(ethersulfone), polystyrene, vinyl polymer, poly(vinyl chloride), poly(vinylidene fluoride), poly(tetrafluoroethylene), poly(benzimidazole), or poly(ethylene glycol).

Examples of commercially available ionomers include Nafion, Aquivion and the like.

The ionomer may be present in an amount of 20 to 45% by weight, and specifically 25 to 38% by weight, based on the total weight of the electrode. If the content of the ionomer is less than 20% by weight, the performance of the fuel cell would be degraded. On the other hand, if the content of the ionomer exceeds 45% by weight, the excessive amount of the ionomer would cause agglomeration in some portions of the ionomer.

The method of manufacturing an electrode includes preparing an electrode-forming composition including the catalyst and the ionomer, and coating the electrode-forming composition to form the electrode.

First, an electrode-forming composition including the catalyst and the ionomer is prepared.

The electrode-forming composition may be prepared by adding the catalyst and the ionomer to a solvent and then dispersing the resulting mixture using any one dispersion method selected from ultrasonic dispersion, stirring, 3-roll milling, planetary stirring, high-pressure dispersion and combinations thereof.

The catalyst may be dispersed in a soaking solution and then mixed with the ionomer, or may be added in the form of a solid to the ionomer.

The solvent may be a solvent selected from the group consisting of water, a hydrophilic solvent, an organic solvent and mixtures thereof.

The hydrophilic solvent may have at least one functional group selected from the group consisting of alcohols, ketones, aldehydes, carbonates, carboxylates, carboxylic acids, ethers and amides containing, as a main chain, a linear, branched, saturated or unsaturated hydrocarbon having 1 to 12 carbon atoms. These may include an alicyclic or aromatic cyclic compound as at least a part of the main chain. Specific examples thereof include: alcohols such as methanol, ethanol, isopropyl alcohol, ethoxy ethanol, n-propyl alcohol, butyl alcohol, 1,2-propanediol, 1-pentanol, 1,5-pentanediol, 1,9-nonanediol and the like; ketones such as heptanone and octanone; aldehydes such as benzaldehyde and tolualdehyde; esters such as methyl pentanoate and ethyl-2-hydroxypropanoate; carboxylic acids such as pentanoic acid and heptanoic acid; ethers such as methoxybenzene and dimethoxypropane; and amides such as propanamide, butylamide and dimethylacetamide.

The organic solvent may be selected from N-methylpyrrolidone, dimethyl sulfoxide, tetrahydrofuran and mixtures thereof.

The solvent may be present in an amount of 80% to 95% by weight based on the total weight of the electrode-forming composition. If the content of the solvent is less than 80% by weight, the excessively high content of solids in the composition might cause, during the coating process, a dispersion problem due to high viscosity and a problem of cracks. On the other hand, if the content of the solvent is greater than 95% by weight, there may be a disadvantage in terms of electrode activity.

Next, the electrode is produced by coating the electrode-forming composition.

As a specific example, the production of the electrode may include coating a release film with the electrode-forming composition to produce an electrode and transferring the electrode to an ion exchange membrane.

When the release film is coated with the electrode-forming composition, it is desirable that the composition including the active material dispersed therein is continuously or intermittently transferred to a coater, and then uniformly applied on the release film to have a thickness of 1 µm to 200 µm after dried.

More specifically, the electrode-forming composition is continuously transferred to a coater such as a die coater, a gravure coater, a bar coater or a comma coater through a pump depending on the viscosity thereof, and then uniformly applied on a decal film in such an amount that a resulting dry electrode layer can have a thickness of 1 µm to 200 µm, more preferably 3 µm to 20 µm, using a method such as slot die coating, bar coating, comma coating, screen printing, spray coating, doctor blade coating or brushing. Then, the coated decal film is passed through a drying furnace maintained at a constant temperature so that the solvent can be volatilized.

If the electrode-forming composition is coated at a thickness of less than 1 µm, the activity of the catalyst could be reduced due to the small catalyst content. On the other hand, if the composition is coated at a thickness exceeding 200 µm, the required movement distance of ions and electrons would increase, thereby increasing resistance.

The drying process may be carried out at 25° C. to 90° C. for 12 hours or longer. If the drying temperature is less than 25° C. and the drying time is shorter than 12 hours, a sufficiently dried electrode cannot be formed. On the other hand, if the drying is conducted at a temperature higher than 90° C., a crack might occur in the electrode.

However, the methods of applying and drying the electrode-forming composition are not limited to ones described above.

Optionally, the method may further include, after drying the electrode-forming composition to produce the electrode, cutting the dried electrode and the release film into a desired size and bonding the same to the ion exchange membrane.

The ion exchange membrane includes an ion conductor. The ion conductor may be a cation conductor having a functional group capable of delivering a cation such as a proton, or an anion conductor having a functional group capable of delivering an anion such as a hydroxyl ion, carbonate or bicarbonate. Since the cation conductor and the anion conductor are the same as those described above, a repeated description is omitted.

The ion exchange membrane may be a reinforced membrane in which the ion conductor fills the pores of a fluorine-based porous support such as e-PTFE or a porous nanoweb support prepared by electrospinning or the like.

A method of bonding the electrode to the ion exchange membrane may be, for example, a transfer method. The transfer method may be performed by hot pressing, i.e., applying heat and pressure using a metal press alone or a metal press with a soft plate of a rubber material such as silicone rubber thereon.

The transfer method may be carried out under conditions of 80° C. to 150° C. and 50 kgf/cm$^2$ to 200 kgf/cm$^2$. If the hot pressing is performed at a temperature lower than 80° C. and at a pressure lower than 50 kgf/cm$^2$, the transfer of the electrode formed on the release film may not be properly performed. On the other hand, if the hot pressing is performed at a temperature higher than 150° C., the polymer of the ion exchange membrane burns and thus a structural deformation of the electrode might be caused. If the hot pressing is performed at a pressure greater than 200 kgf/cm$^2$, the electrode would be more likely to be compressed rather than transferred to the ion exchange membrane, and thus the transfer may not be performed properly.

The membrane-electrode assembly according to the present invention includes an anode, a cathode, and an ion exchange membrane between the anode and the cathode, wherein at least one of the anode and the cathode is the electrode according to the present invention described above.

Since the electrode, the method for manufacturing the electrode, and the ion exchange membrane are the same as those described above, a repeated description thereof will be omitted.

Figure 2:
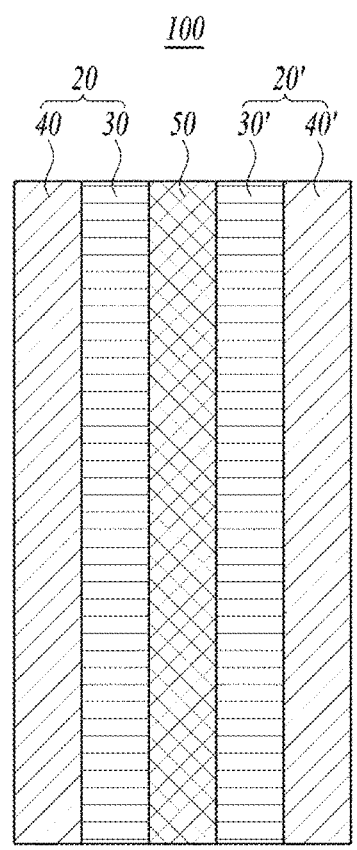
FIG. 2 is a schematic cross-sectional view showing a membrane-electrode assembly according to an embodiment of the present invention.

FIG. 2 is a schematic sectional view showing a membrane-electrode assembly according to an embodiment of the present invention. Referring to FIG. 2, the membrane-electrode assembly 100 comprises an ion exchange membrane 50 and electrodes 20 and 20' disposed on respective surfaces of the ion exchange membrane 50. The electrodes 20 and 20' comprise electrode substrates 40 and 40' and catalyst layers 30 and 30' respectively formed on the surfaces of the electrode substrates 40 and 40', and may further comprise microporous layers (not shown) between the electrode substrates 40 and 40' and the catalyst layers 30 and 30', the microporous layers including conductive fine particles such as carbon powder, carbon black and etc., so that the materials can be diffused well in the electrode substrates 40 and 40'.

In the membrane-electrode assembly 100, the electrode 20, which is disposed on one surface of the ion exchange membrane 50 and causes an oxidation reaction to generate hydrogen ions and electrons from a fuel transferred to the catalyst layer 30 through the electrode substrate 40, is referred to as an "anode", and the electrode 20', which is disposed on the other surface of the ion exchange membrane 50 and causes a reduction reaction to generate water from the hydrogen ions supplied through the ion exchange membrane 50 and an oxidizing agent transferred to the catalyst layer 30' through the electrode substrate 40', is referred to as a "cathode".

At least one of the catalyst layer 30 of the anode 20 and the catalyst layer 30' of the cathode 20' includes the catalyst according to an embodiment of the present invention described above.

The electrode substrates 40 and 40' may be porous conductive substrates to ensure the smooth supply of hydrogen or oxygen. Typical examples thereof include a carbon paper, a carbon cloth, a carbon felt or a metal cloth (a porous film including a fibrous metal cloth or a polymer fiber-made cloth with a metal film formed thereon), but are not limited thereto. The electrode substrates 40 and 40' are preferably waterproof-treated with a fluorine-based resin in order to prevent deterioration in the reactant diffusion efficiency which otherwise might be caused by the water generated during the operation of the fuel cell. Examples of the fluorine-based resin include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene or copolymers thereof.

The membrane-electrode assembly 100 can be produced according to a conventional method of manufacturing a membrane-electrode assembly except that the electrodes according to an embodiment of the present invention are used as the anode 20 and/or the cathode 20'.

The fuel cell of the present invention includes the membrane-electrode assembly of the present invention described above.

Figure 3:
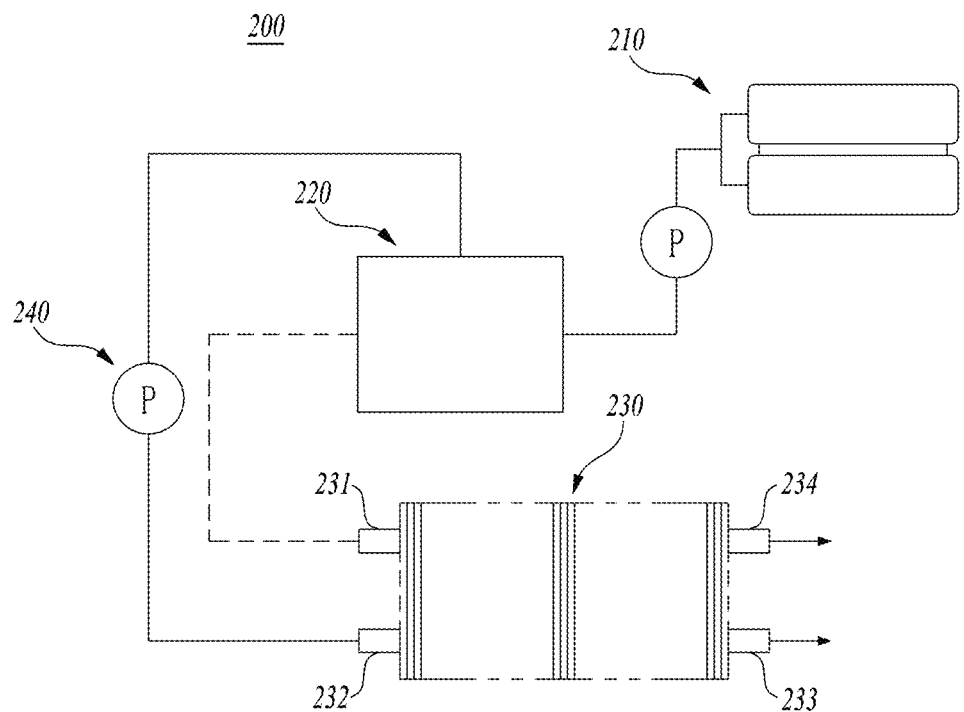
FIG. 3 is a schematic diagram showing the overall configuration of a fuel cell according to an embodiment of the present invention.

FIG. 3 is a schematic diagram showing the overall configuration of a fuel cell according to an embodiment of the present invention. Referring to FIG. 3, the fuel cell 200 comprises a fuel feeder 210 for feeding a fuel mixture of a fuel and water, a reformer 220 for reforming the fuel mixture to generate a reformed gas including hydrogen gas, a stack 230 for generating electrical energy through electrochemical reaction between an oxidizing agent and the reformed gas including hydrogen gas supplied from the reformer 220, and an oxidizing agent feeder 240 for feeding the oxidizing agent to the reformer 220 and the stack 230.

The stack 230 includes a plurality of unit cells for generating electrical energy by inducing an oxidation/reduction reaction between the reformed gas including hydrogen gas supplied from the reformer 220 and the oxidizing agent supplied from the oxidizing agent feeder 240.

Each unit cell refers to a cell of a unit for generating electricity, and comprises: a membrane-electrode assembly for oxidizing the reformed gas including hydrogen gas and reducing oxygen in the oxidizing agent; and separator plates (also called "bipolar plates") for feeding the reformed gas including hydrogen gas and the oxidizing agent to the membrane-electrode assembly. The membrane-electrode assembly is interposed between the separator plates. Separator plates respectively located at the outermost sides of the stack are specifically referred to as "end plates".

The one end plate of the separator plates is provided with a pipe-shaped first supply pipe 231 for introducing the reformed gas including hydrogen gas supplied from the reformer 220 and a pipe-shaped second supply pipe 232 for introducing oxygen gas. The other end plate is provided with a first discharge pipe 233 for discharging the reformed gas including the remaining hydrogen gas unreacted in the plurality of unit cells to the outside and a second discharge pipe 234 for discharging the remaining oxidizing agent unreacted in the unit cells to the outside.

The electrode is applicable to various fields such as secondary batteries or capacitors, in addition to the membrane-electrode assembly for fuel cells.

Hereinafter, the present invention will be described in more detail with reference to examples. However, these examples are provided only for illustration of the present invention and should not be construed as limiting the scope of the present invention. In addition, contents not described herein can be sufficiently technically conceived by those skilled in the art, and a description thereof will thus be omitted.

1. PREPARATION EXAMPLE

Post-Treatment of Catalyst

(1) Example 1

A commercially available Pt/C catalyst (raw catalyst) was added to a reaction vessel and dispersed in distilled water.

Subsequently, a $H_2PtCl_6$ solution (metal precursor) and hexamethylenetetramine (weak reducing agent) were added to the distilled water in which the raw catalyst had been dispersed, and then mixed. The weight ratio of the raw catalyst, the metal precursor, and the weak reducing agent was about 1:1:6.

The mixture thus obtained was hydrothermally treated at 130° C. for 8 hours.

After the hydrothermal treatment, the catalyst was dried and collected.

(2) Example 2

A commercially available Pt/C catalyst (raw catalyst) was added to a reaction vessel and dispersed in distilled water.

Subsequently, a $H_2PtCl_6$ solution (metal precursor), a NaOH solution, and hexamethylenetetramine (weak reducing agent) were added to the distilled water in which the raw catalyst had been dispersed, and then mixed. The weight ratio of the raw catalyst, the metal precursor, the NaOH solution, and the weak reducing agent was about 1:1.5:1:5.

The mixture thus obtained was hydrothermally treated at 150° C. for 12 hours.

After the hydrothermal treatment, the catalyst was dried and collected.

(3) Example 3

A commercially available Pt/C catalyst (raw catalyst) was added to a reaction vessel and dispersed in distilled water.

Subsequently, a $H_2PtCl_6$ solution (metal precursor) and hexamethylenetetramine (weak reducing agent) were added to the distilled water in which the raw catalyst had been dispersed, and then mixed. The weight ratio of the raw catalyst, the metal precursor, and the weak reducing agent was about 1:1:3.

The mixture thus obtained was hydrothermally treated at 100° C. for 12 hours.

After the hydrothermal treatment, the catalyst was dried and collected.

(4) Example 4

A commercially available Pt/C catalyst (raw catalyst) was added to a reaction vessel and dispersed in distilled water.

Subsequently, a $H_2PtCl_6$ solution (metal precursor) and hexamethylenetetramine (weak reducing agent) were added to the distilled water in which the raw catalyst had been dispersed, and then mixed. The weight ratio of the raw catalyst, the metal precursor, and the weak reducing agent was about 1:2:6.

The mixture thus obtained was hydrothermally treated at 100° C. for 15 hours.

After the hydrothermal treatment, the catalyst was dried and collected.

(5) Comparative Example 1

A commercially available Pt/C catalyst (raw catalyst) was added to a reaction vessel and dispersed in distilled water.

Subsequently, a $H_2PtCl_6$ solution (metal precursor), a NaOH solution, and an aqueous $NaBH_4$ solution (strong reducing agent) were added to the distilled water in which the raw catalyst had been dispersed, and then mixed. The weight ratio of the raw catalyst, the metal precursor, the NaOH solution, and the strong reducing agent was about 1:1:1:10.

The mixture thus obtained was hydrothermally treated at an ambient temperature of 20° C. for 6 hours.

After the hydrothermal treatment, the catalyst was dried and collected.

(6) Comparative Example 2

A commercially available Vulcan carbon support was added to a reaction vessel and dispersed in distilled water.

Subsequently, a $H_2PtCl_6$ solution (metal precursor) and hexamethylenetetramine (weak reducing agent) were added to the distilled water in which the support had been dispersed, and then mixed. The weight ratio of the support, the metal precursor, and the weak reducing agent was about 1:5:15.

The mixture thus obtained was hydrothermally treated at 100° C. for 12 hours to prepare a catalyst.

The resulting catalyst was then dried and collected.

2. Experimental Example 1

Transmission Electron Microscopy of Catalyst

Figure 4:
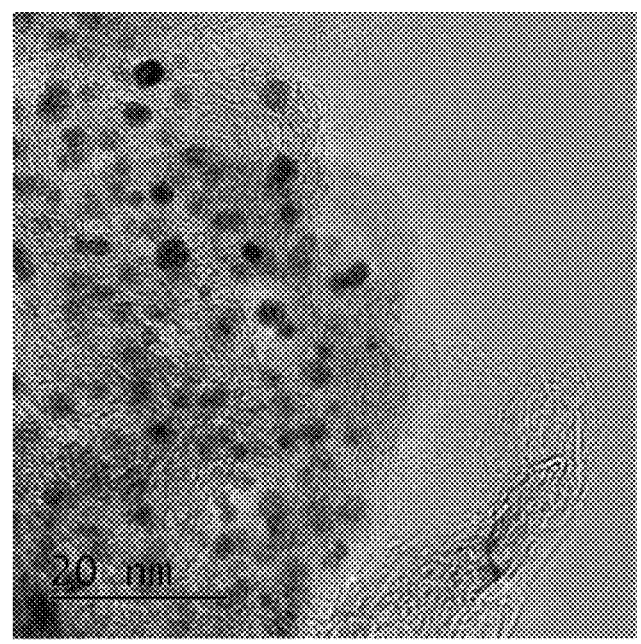
FIG. 4 is a transmission electron microscope (TEM) image of a raw catalyst before post-treatment.
Figure 5:
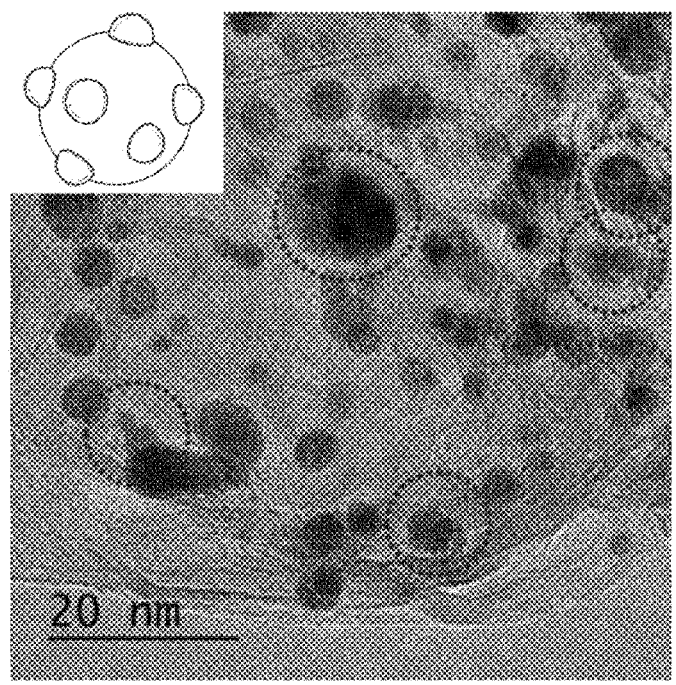
FIG. 5 is a transmission electron microscope (TEM) image showing the post-treated catalyst in accordance with Example 1 of the present invention.
Figure 6:
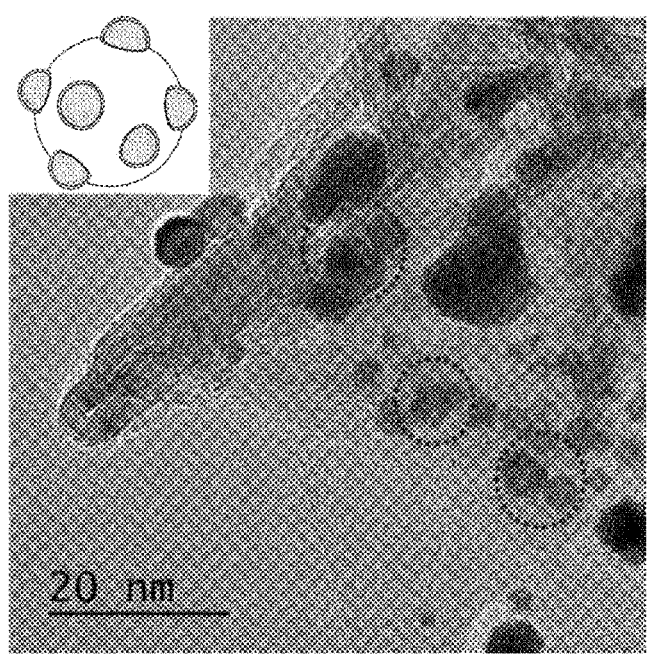
FIG. 6 is a transmission electron microscope (TEM) image showing the post-treated catalyst in accordance with Example 2 of the present invention.
Figure 7:
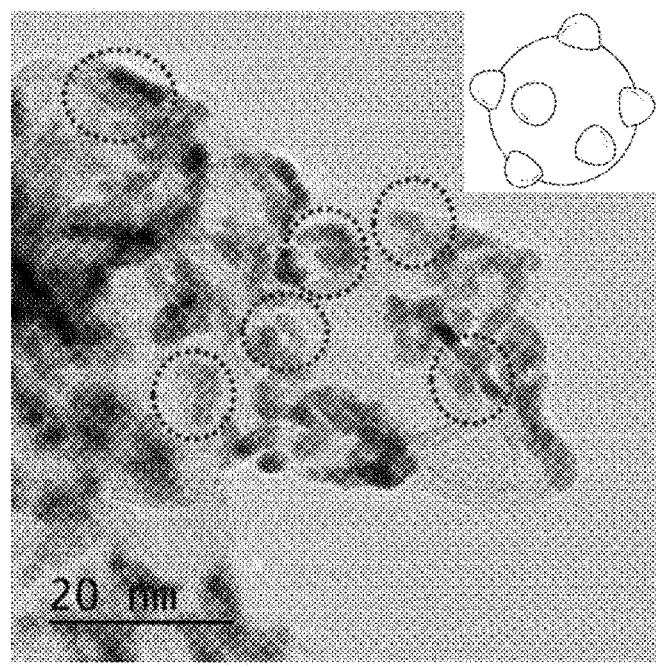
FIG. 7 is a transmission electron microscope (TEM) image showing the post-treated catalyst in accordance with Example 3 of the present invention.
Figure 8:
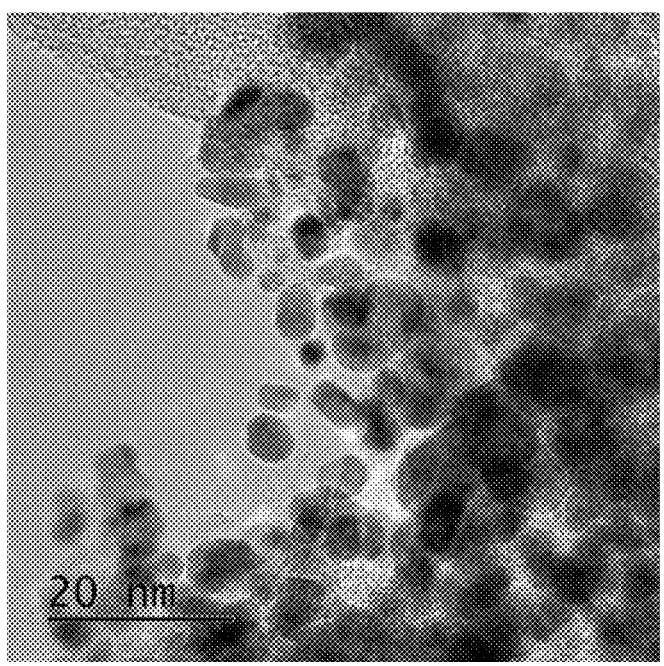
FIG. 8 is a transmission electron microscope (TEM) image showing the post-treated catalyst in accordance with Example 4 of the present invention.
Figure 9:
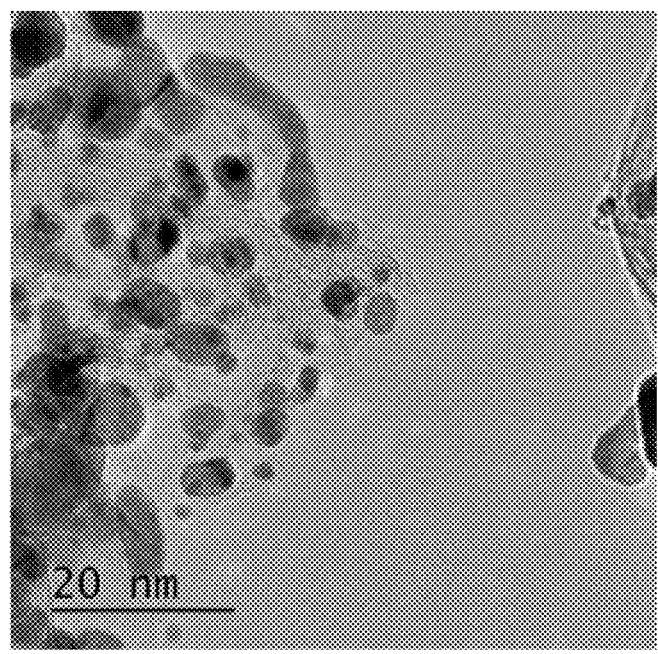
FIG. 9 is a transmission electron microscope (TEM) image showing the post-treated catalyst in accordance with Comparative Example 1 of the present invention.

FIG. 4 is a transmission electron microscope (TEM) image of a raw catalyst before post-treatment, FIGS. 5 to 8 are transmission electron microscope (TEM) images showing the post-treated catalysts in accordance with the Examples 1 to 4, respectively, and FIG. 9 is a transmission electron microscope (TEM) image showing the post-treated catalyst in accordance with the Comparative Example 1.

As can be seen from FIGS. 4 to 9, the metal particles before the post-treatment exhibit spherical shapes, whereas Example 1 exhibits a large number of bud-structured metal particles and Example 2 exhibits a large number of core-shell structured metal particles.

In addition, Example 3 exhibits a large number of rod-shaped metal particles, and Example 4 exhibits significantly large number of rod-shaped metal particles.

On the other hand, Comparative Example 1, in which hydrothermal treatment is performed using a strong reducing agent, exhibits agglomeration of metal particles.

3. Experimental Example 2

XRD Analysis of Catalyst

Figure 10:
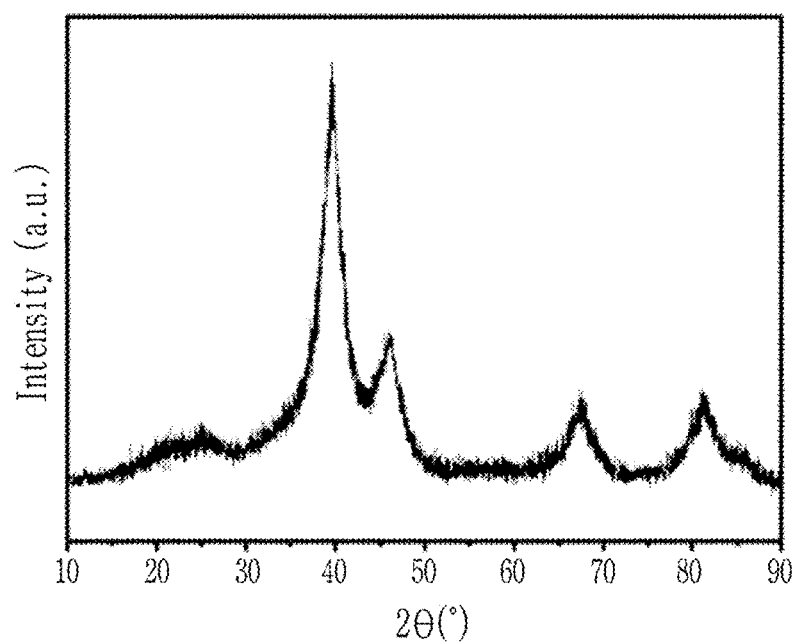
FIG. 10 is a graph showing the result of XRD analysis of a raw catalyst before post-treatment.
Figure 11:
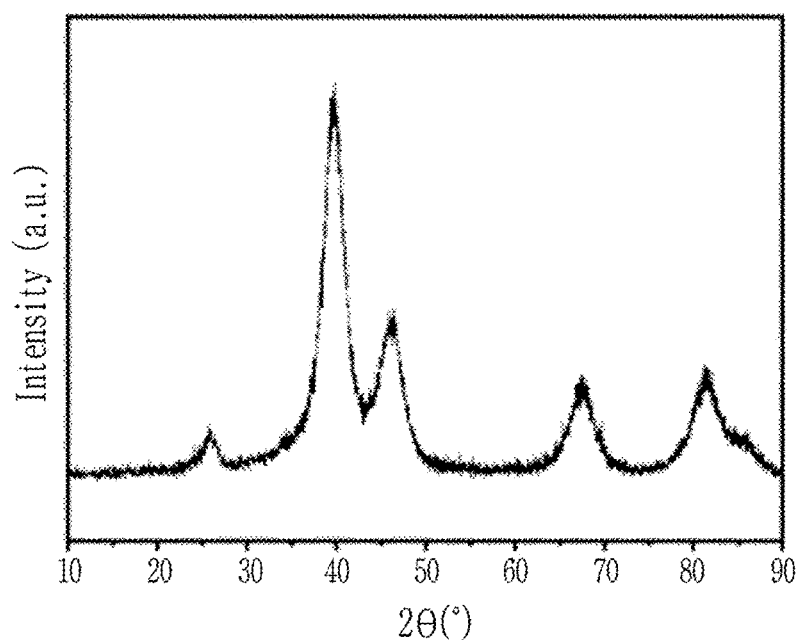
FIG. 11 is a graph showing the result of XRD analysis of the post-treated catalyst in accordance with Example 1 of the present invention.
Figure 12:
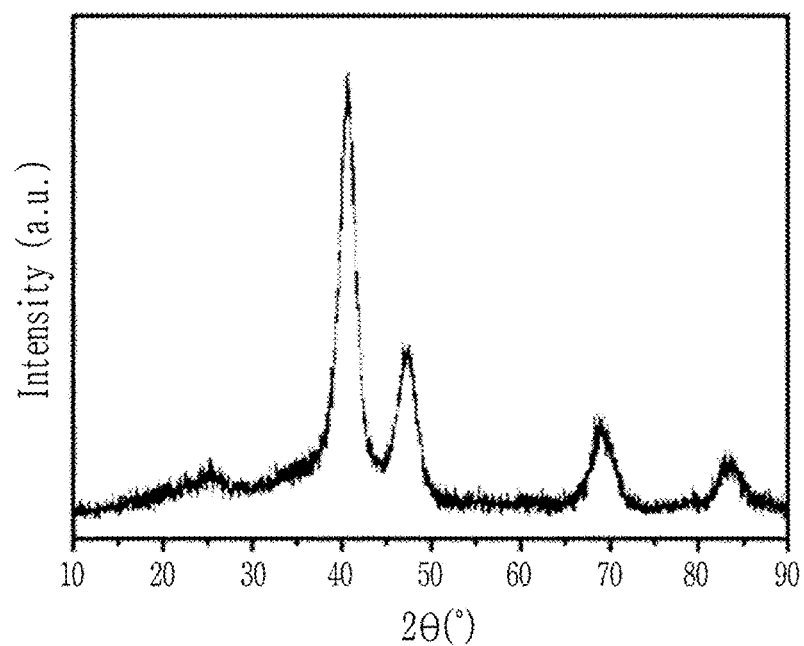
FIG. 12 is a graph showing the result of XRD analysis of the post-treated catalyst in accordance with Example 2 of the present invention.
Figure 13:
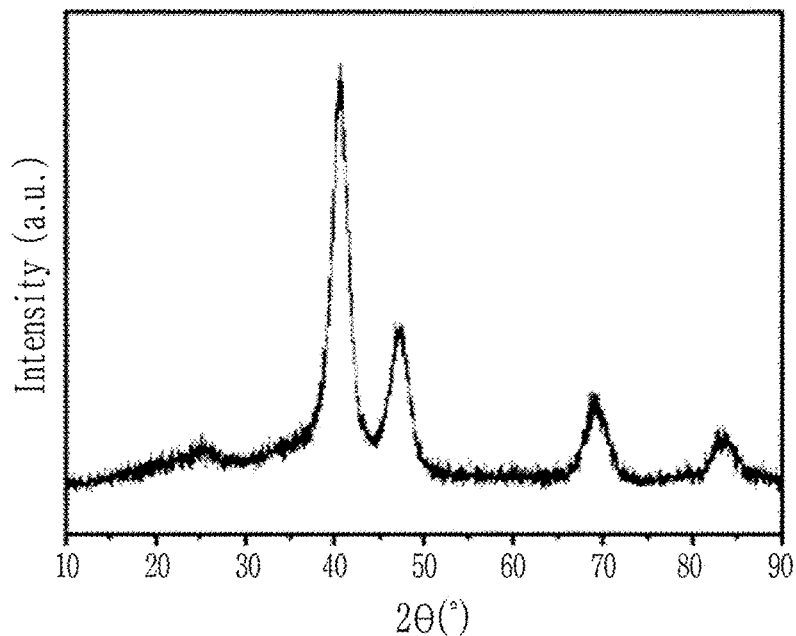
FIG. 13 is a graph showing the result of XRD analysis of the post-treated catalyst in accordance with Example 3 of the present invention.
Figure 14:
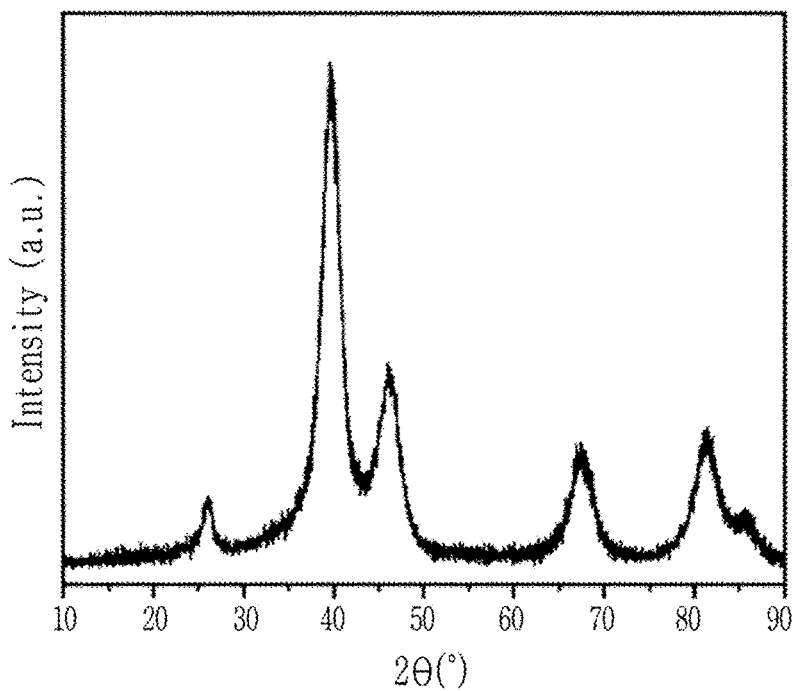
FIG. 14 is a graph showing the result of XRD analysis of the post-treated catalyst in accordance with Example 4 of the present invention.
Figure 15:
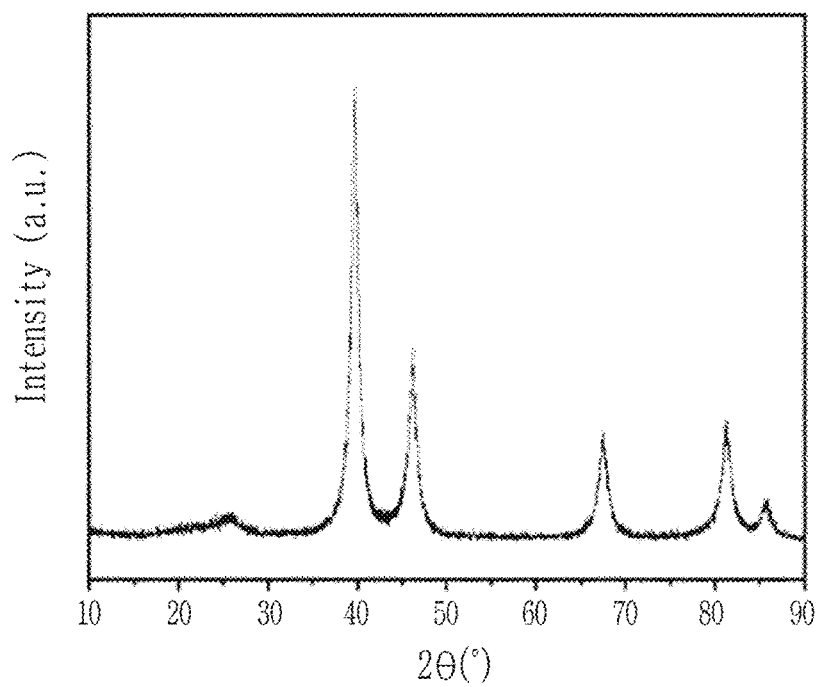
FIG. 15 is a graph showing the result of XRD analysis of the post-treated catalyst in accordance with Comparative Example 1 of the present invention.

FIG. 10 is a graph showing the result of XRD analysis of a raw catalyst before post-treatment, FIGS. 11 to 14 are graphs showing the results of XRD analysis of the post-treated catalysts in accordance with Examples 1 to 4 of the present invention, respectively, and FIG. 15 is a graph showing the result of XRD analysis of the post-treated catalyst in accordance with Comparative Example 1.

As can be seen from the results of XRD analysis shown in FIGS. 10 to 15, the metal particles of Examples 1 to 4 are larger than the main particles of the raw catalyst, and exhibit increased crystallinity. In addition, a tendency of the proportion of the specific active surface to increase was shown.

In addition, Comparative Example 1 also exhibits the XRD results peculiar to large crystals in the same manner as in the Examples.

4. Experimental Example 3

Cyclovoltammetry (CV) Evaluation

The catalyst that had been subjected to post-treatment in accordance with the method of Example 3 and the raw catalyst before post-treatment were respectively added to the solutions each prepared by mixing an ionomer with isopropanol, and then sonicated to prepare respective electrode-forming compositions.

Subsequently, each of the electrode-forming compositions was applied to a rotating disk electrode made of a glass carbon material and then dried to prepare a working electrode (active area of $0.196$ cm$^2$).

Cyclovoltammetry (CV) activity was measured in a 1M $HClO_4$ electrolyte solution using an electrochemical measuring device with the working electrode, Ag/AgCl electrode (reference electrode), and platinum wire (counter electrode).

Figure 16:
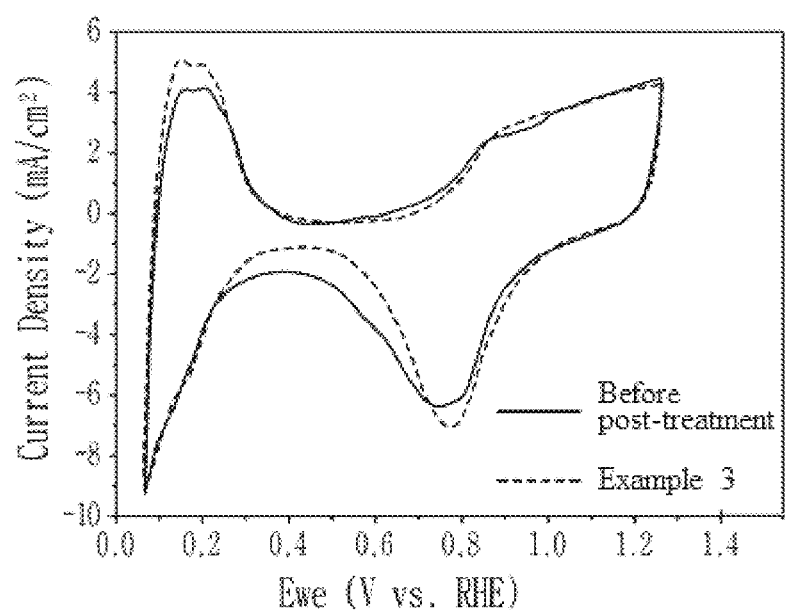
FIG. 16 is a graph showing the results of measurement of the cyclovoltammetry (CV) activity of electrodes each including a raw catalyst before post-treatment and the post-treated catalyst in accordance with Example 3, respectively.

FIG. 16 is a graph showing the results of measurement of the cyclovoltammetry (CV) activity of the electrodes each including the raw catalyst before post-treatment and the post-treated catalyst in accordance with Example 3, respectively.

As can be seen from FIG. 16, the electrode including the catalyst of Example 3 exhibits an increase of about 18% in the electrochemically active area (ECSA) compared to the electrode including the raw catalyst. This evidences that the post-treatment of the present invention resulted in better bonding between the ionomer and the catalyst.

Figure 17:
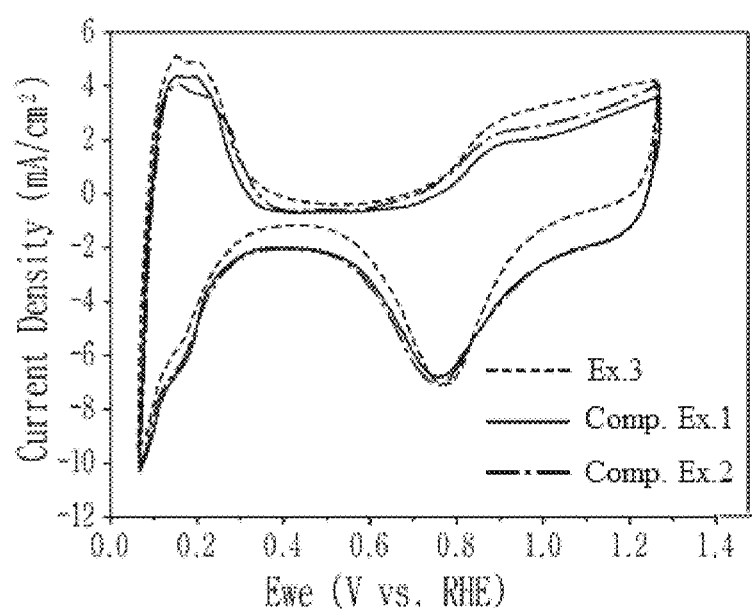
FIG. 17 is a graph showing the results of measurement of the cyclovoltammetry (CV) activity of electrodes each including the catalyst of Example 3, the catalyst of Comparative Example 1, and the catalyst of Comparative Example 2, respectively.

FIG. 17 is a graph showing the results of measurement of the cyclovoltammetry (CV) activity of electrodes each including the post-treated catalyst of Example 3, the catalyst post-treated using a strong reducing agent in accordance with Comparative Example 1, and the catalyst prepared in accordance with Comparative Example 2, respectively.

As can be seen from FIG. 17, the electrode including the catalyst according to Example 3 of the present invention has a larger electrochemically active area (ECSA) than the electrodes respectively including the catalysts of Comparative Examples 1 and 2.

The invention claimed is:

1. A method for manufacturing a catalyst, the method comprising:
    preparing a raw catalyst comprising a support and a main particle supported on the support;
    preparing a metal precursor, wherein the main particle and the metal precursor comprise the same metal element;
    preparing a weak reducing agent selected from the group consisting of formaldehyde, formic acid, oxalic acid, ascorbic acid, citric acid, urea, ethylenediamine, hexamethylenetetramine and mixtures of two or more thereof;

mixing the raw catalyst, the metal precursor, and the weak reducing agent to obtain a mixture; and hydrothermally treating the mixture at a temperature of 110 to 150° C. for 6 to 10 hours such that only a specific active lattice plane of the main particle selectively grows.

2. The method according to claim 1, wherein the support is selected from the group consisting of carbon black, porous carbon, carbon fiber, carbon nanotube (CNT), carbon nanohorn and graphene.

3. The method according to claim 1, wherein the main particle comprises at least one selected from the group consisting of platinum (Pt), palladium (Pd), ruthenium (Ru), iridium (Ir), osmium (Os), and a platinum-Me alloy, wherein Me is at least one metal element selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), niobium (Nb), tantalum (Ta), zirconium (Zr), cerium (Ce), yttrium (Y) and rhodium (Rh).

\* \* \* \* \*